United States Patent [19]
Owens

[11] 4,139,876
[45] Feb. 13, 1979

[54] RECORD EJECTING AND POSITIONING ASSEMBLY

[75] Inventor: William M. Owens, La Palma, Calif.

[73] Assignee: Micro Peripherals, Inc., Sepulveda, Calif.

[21] Appl. No.: 825,526

[22] Filed: Aug. 18, 1977

[51] Int. Cl.² .................... G11B 17/02; G11B 5/012
[52] U.S. Cl. .................................................. 360/97
[58] Field of Search ..................... 360/97, 99, 93, 96

[56] References Cited

U.S. PATENT DOCUMENTS

| | | | |
|---|---|---|---|
| 3,770,908 | 11/1973 | Craggs | 360/97 |
| 3,803,368 | 4/1974 | Artner et al. | 360/93 |
| 3,890,643 | 6/1975 | Dalziel | 360/99 |
| 3,940,793 | 2/1976 | Bleiman | 360/99 |

*Primary Examiner*—Robert S. Tupper
*Attorney, Agent, or Firm*—Albert M. Herzig; Edward C. Walsh

[57] ABSTRACT

A record drive and positioning assembly particularly adapted for disc records used for recording of digital information and for use in association with computers. The unit embodies a record driving spindle or hub and clutch. The record is insertable into the unit through a hinged door. Ejector mechanism is provided in association with a latch, the ejector being operative to eject the record unless it is inserted fully in a latching position. The mechanism provides for "feel" so that the operator will know when the record is fully inserted. During closing of the door, a pin will unlatch the ejector allowing the ejector to move the record sufficiently to cause it to accurately register with the driving hub and clutch. When the door is opened by being lifted, the ejector will eject the record from the unit.

7 Claims, 9 Drawing Figures

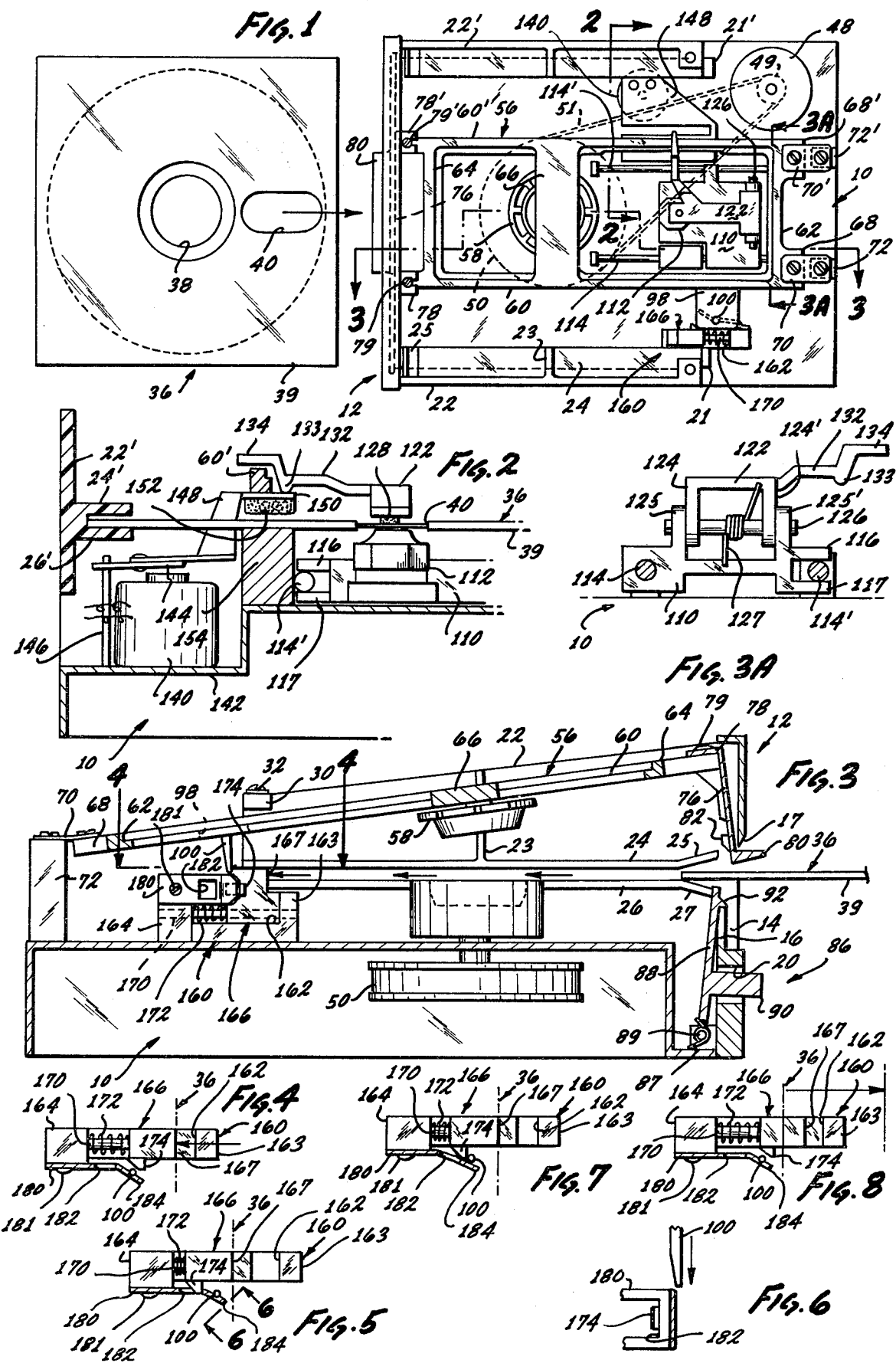

RECORD EJECTING AND POSITIONING ASSEMBLY

BACKGROUND OF THE INVENTION

1. Field of the Invention

The field of the invention is that of units embodying disc record driving mechanism in association with a read-out or pick-up head whereby digital information can be either recorded or read out through a pick-up head.

2. Description of the Prior Art

Magnetic records and recording and pick-up devices associated therewith are, of course, known in the prior art. Typically, a motor drive is provided with a hub and a drive clutch arranged so that the a center hole or opening in the record is engaged between the drive hub and the drive clutch. Typically, the record has plural tracks as for example in some records, there may be forty tracks or in other larger records, seventy-eight tracks. The record, when in position to be driven, has a magnetic recording or pick-up head in engagement with it engaging one of the tracks.

A difficulty in the prior art has been occasioned by the problem of positioning the record in a unit so that the center hole in the record accurately registers with the driving hub and the driving clutch. If the record is not accurately positioned it may be the occasion of damage to the center hole in the record impairing the accuracy of operations. Difficulties of this type are overcome by the herein invention which has the particular characteristics as described in detail hereinafter.

SUMMARY OF THE INVENTION

The invention is an improvement in mechanical units or assemblies wherein a record having multiple tracks is driven in association with a magnetic pick-up and read-out head. The record may be a flexible type record having a plurality of tracks, such as forty, or in larger records, as many as seventy-eight. In this type of assembly, the magnetic head is moved linearly along a diagonal of the record from one track to another. Typically, the head is driven by a stepper motor which is actuated in response to signals from a computer.

In the examplary form of the invention as described in detail herein, a unit is provided having a door which is opened or lifted for purposes of manually inserting a record into the unit, the center hole in the record coming into registry with a drive hub and with a drive clutch.

The invention provides a spring actuated ejector mechanism. The record comes into engagement with the ejector when it is being inserted. A latch is associated with the ejector so that the ejector becomes latched when the record is fully inserted. If the record is not fully and properly inserted, the ejector will eject it back out again. This provides a "feel" for the operator so that the operator definitely knows when full insertion and latching has been realized. Additional mechanism is provided in the form of means actuated by the open door when it is being closed which unlatches the latching means so that the ejector then acts on the record to accurately position it with its center hole registering with the driving hub and the clutch. This takes place just before the door member is closed. Additionally, the means or member actuated by the door engages with the ejector to restrain it when the door is closed until such time as the door is opened whereupon the ejector promptly ejects the record out through the door.

In the light of the foregoing, the primary object of the invention is to realize a mechanism in association with record drive assemblies operative to eject a record upon insertion into the unit unless the record is fully inserted and to provide latching means to latch the ejecting means when full insertion has been realized.

A further object is to realize mechanism as in the foregoing object wherein the record drive assembly includes a door for covering an opening through which the record is inserted, the door embodying means to unlatch the ejector mechanism upon closing of the door so that the ejector mechanism can then properly position the record relative to the driving means, the said means being further arranged to hold the ejector in position until such time as the door is opened so as then to allow the record to be ejected.

Further objects and additional advantages of the invention will become apparent from the following detailed description and annexed drawings.

BRIEF DESCRIPTION OF THE DRAWINGS

FIG. 1 is a plan view of the frame of the unit holding the drive means for the record and the pick-up head, this view including a view of the record itself;

FIG. 2 is a sectional view, taken along the line 2—2 of FIG. 1;

FIG. 3 is a sectional view, taking along the line 3—3 of FIG. 2;

FIG. 3A is a view taken along the line 3A—3A of FIG. 1;

FIGS. 4–8 are detail views illustrating the operation of the ejector mechanism and the ejector latch mechanism.

DESCRIPTION OF THE PREFERRED EMBODIMENT

As previously pointed out, the unit which is shown in the drawings embodies a frame whereby the unit may be incorporated into or associated with a computer.

Numeral 10 designates a rectilinear base frame which can be made of aluminum or the like. At the front of the unit is a front panel 12 attached to the base frame, the front panel preferably being made from material such as plastic or the like. The front panel is recessed as shown at 14 and at the recessed portion there is an opening, the bottom edge of which is shown at 16, and the top edge of which is shown at 17. This recess will be referred to again presently. In the front panel is an additional rectilinear recess or opening 20 which will be referred to again presently.

There are two side panels which preferably are made of plastic material or the like which are upstanding from the top surface of the base member 10 as designated at 22 and 22'. The front edges of these side members are secured to the front panel 12, being attached to an inwardly extending flange at the side edges of the front panel 12. The side members are also secured to posts 21 and 21' upstanding from base 10.

On the inside of the member 22, as may be seen in FIG. 3, is a vertical strengthening rib 23 and a pair of inwardly extending longitudinal ribs 24 and 26 which form a slide channel between them. At the entrance edge of this slide channel the ends of the ribs 24 and 26 diverge as may be seen at 25 and 27 to accommodate the entrance of the edge of the record between them. At the upper end of the side member 22 at its inner end is a boss or projection 30 with a screw 32 for purposes of attaching a top cover if desired. The side member 22' is like the side member 22 and therefore need not be described in detail.

It will be understood that the members 24 and 26 and the corresponding members on the inside of the side member 22' provide a guideway so as to guide a record into position in the unit, the record itself being designated by the numeral 36 and as previously described, the record may be a flexible record known in the trade as a "Diskette". The record itself is round, having a center opening as designated at 38 and preferably is in a rectangular jacket or container as designated at 39, the jacket or container having an opening in it as designated at 40 which is positioned to accommodate the recording or pick-up head. As previously described, the record is of a type that may have, for example, forty eight circular tracks with information recorded on the record in the form of bits, that is, digital information.

Carried on the base 10 is a drive motor 48 for the record, the motor having a pulley 49 which drives a larger pulley 50 by way of a belt 51 schematically indicated in FIG. 1. The pulley 50 is on the shaft of a hub which, as will be described, is engageable with a clutch which engages the record for driving it. Parts as just described are within the base 10 below the top.

Numeral 56 designates a generally rectangular frame member which carries the circular drive clutch 58 that causes the record to be driven, as will be described. The frame 56 may preferably be made from a light material, such as aluminum. It has side members 60 and 60', an end member 62, a transverse end member 64, and an intermediate transverse member 66. The end member 62 has extensions 68 and 68'. Numerals 70 and 70' designate a pair of leaf springs attached to the extensions 68 and 68', and also to supporting posts 72 and 72' upstanding from the top surface of the base 10, one of which is shown in FIG. 3.

Attached to the front end of the frame member 56 is a panel or door 76 having inwardly extending brackets 78 and 78' which are secured to the ends of the frame 56 by screws 79 and 79' as may be seen in FIGS. 1 and 3. The panel 76 has an outwardly extending finger piece 80 which extends outwardly through the recess 14 in the front panel 12 to be accessible to be operated by the fingers of the operator. Extending inwardly from the panel 76 is a latching shoulder 82.

Numeral 86 designates a latching trigger having an inner part 88, the lower end of which is hinged on a transverse hinge pin 89 there being a biasing spring 87 which normally urges the latching trigger member in a clockwise direction as it appears in FIG. 3. The latching trigger has a finger piece 90 which extends outwardly through the recess 20 in the front panel 12, as may be seen in FIG. 3. The member 88 has an outwardly extending latching shoulder 92 that can engage the shoulder 82 on the frame 56 for latching the frame in a downward or closed position, the frame being rotatable around the leaf springs 70 and 70'.

The longitudinal member 60' of the frame 56 has an extending bracket piece 98 that may be seen in FIG. 1 and adjustably carried by it is a bracket with a downwardly extending pin 100 as may be seen in FIG. 3 and FIGS. 5–8 which will be referred to again presently.

FIGS. 1 and 2 illustrate the adjustable pick-up head that cooperates with the record and the means whereby pressure is applied to the record and means for loading the record positioned over the head. Numeral 110 designates a plastic sliding block which carries the recording or pick-up head 112. The block 110 is mounted to be movable in a direction along a diameter with respect to the record 36. Numerals 114 and 114' designate guide rods carried by posts upstanding from the top of the base 10, the block 110 being slidable with respect to these posts. At one side of the block 110 there is a bore extending through it through which the guide rod 114 extends. At the other side of the block 110 are extending projections 116 and 117 which fit on opposite sides of the guide rod 114' as may be seen in FIG. 2. When the record is in position in the unit, the gap 40 in the jacket of the record moves into a position with respect to the pick-up head 112 as may be seen in FIG. 2.

Mounted on the block 110 is a head loading arm 122. The right end of this arm has legs 124 and 124' which are hinged on a hinge pin 126 mounted in legs 125 and 125' upstanding from the top surface of block 110. See FIG. 3A. Arm 122 is biased by spring 127. At the left end of the head loading arm 122 is a felt pad 128 that can come down into position over the pick-up head 112. Extending to one side of the head loading arm 122 is an auxiliary arm 132 as may be seen in FIG. 2 which has a downwardly extending abutment 133 and an angular end piece 134 which will be referred to again presently.

It will be understood that the unit as described operates in conjunction with a computer receiving digital signal information from the computer or delivering such information to the computer. The computer delivers signals to a stepper motor which is mounted underneath the top surface of the base 10, the stepper motor being arranged to adjust the block 10 carrying the pick-up head relatively to the tracks on the record. Details of this mechanism are not shown herein; however, such mechanism may be of the type shown in the co-pending application, Ser. No. 825,524, filed Aug. 18, 1977, and assigned to the same assignee as the herein application.

Means are provided for applying pressure to the record urging into proper engagement with the pick-up head. Numeral 140 designates a small electrical solenoid that is mounted on a shelf 142 provided in the top surface of the base 10. Numeral 144 designates an armature cooperating with the solenoid 140, the armature being mounted on an upright standard 146. The armature 144 carries an arm 148 that may be of metal, such as brass, the arm having a relatively elongated end piece 150 which on its underside carries a pad 152 which is in a position overlying the record 36 and overlying a platform member 154 upstanding from the top surface of the base 10. When the solenoid 140 is energized, the armature 144 is pulled down and the end piece 150 and pad 152 are urged downwardly onto the record in a manner to apply pressure to the record and to produce a slight bend in it such that the record is urged into engagement with the pick-up head.

During operation, the record, as will be described, rotates within the jacket 90, the opening or gap 40 in the jacket remaining in the same position.

Particular means are provided to ensure that when the record is inserted, it is correctly positioned for proper operation by the rotary driving means. This means also embodies mechanism which ensures that the record is properly positioned when inserted or otherwise it will be automatically ejected before the door is closed.

The mechanism just referred to is shown in FIGS. 1, 3 and FIGS. 5–8. Numeral 160 designates a small bracket secured to the top surface of the base 10. It has a rectilinear cut-out in it as designated at 162 so that there is an upstanding part 163 at one end of it and an upstanding part 164 at the outer end of it. See FIG. 3. Slidable in the cut-out is the ejector member as designated at 166, the ejector member having a square shoulder in it as designated at 167. Numeral 170 designates a stem that extends between the upright parts 163 and 164 of the bracket 160, the ejector member 166 being mounted on this stem and being biased forwardly by spring 172. On the side of the ejector member is a latching finger 174 providing a square shoulder. See FIGS. 1 and 4–8.

Secured to one side of the upright part 164 is a flexible latching spring 180 which is secured by rivet 181. The latching spring has in it opening 182 which can cooperate with the latching projection or finger 174 on the ejector member or block 166. The end of the spring 180 has an outwardly bent end portion 184 which can cooperate with the previously described pin 100.

OPERATION

As previously indicated, digital information can either be recorded on the recorder or read out from the record in cooperation, for example, with a computer. The block 110 carrying the recording head normally will be operated by a stepping motor in response to signals from a computer so that it is moved in steps along a diameter of the record from one track to another. This mechanism may be mechanism that is already known or as previously indicated is like that of the co-pending application, Ser. No. 825,524, filed Aug. 18, 1977, assigned to the same assignee as this application.

The loading mechanism operates as previously described. The solenoid 140 acts on the armature 144 to move the arm 148 so as to move the pad 152 against the record 36 so that pressure is applied against the recording head. When the arm 148 is moved downwardly, its end part 150 moves away from knob 133 on the knob 132 so as to release upward force on this arm thereby allowing the loading arm 132 to move downwardly so that the pad 128 is moved against the record opposite to the recording head.

Operation of the Ejector Mechanism

The record in its jacket is inserted through the opening or recess 14 as illustrated in FIG. 3 and it is guided in the side guide channels until it strikes the ejector member or ejector block 166 coming up against the square shoulder 167. The sequence of operations is illustrated in the small FIGS. 4–8. The operator pushes the record in until the ejector member 166 is moved against the spring 172 until the latching finger 174 on the ejector member 166 latches in the opening 182 in the spring 180. This movement and latching is illustrated in the progression from FIG. 4 to FIG. 5 which shows the ejector member latched. If the operator does not push the record in far enough to latch, the ejector member will push the record back out through the recess 14. The mechanism provides a definite "feel" to the operator so that the operator will know positively when latching has occurred. When latching has occurred, the operator closes the door, that is, moves the frame 56 downwardly moving the end panel 76 down over the recess 14 with the latching finger 82 on the inside of it latching under the latching projection or hook 92 on the trigger member 86. When the door is being closed in this manner, the pin 100 which is bevelled at the end on its inner side, as shown in FIG. 6, comes down and engages the bent end part 184 of the spring 180 so as to effect unlatching of the opening 182 from the latching projection 174 as illustrated in FIG. 7. The spring 172 now acting on the ejector member 166 will push the record out slightly until the hole 38 in it is accurately aligned with the driving hub which is directly under the clutch member 58. The unlatching occurs as the door, that is, the frame 56, is being closed, just before full closure so that the alignment of the record with the driving hub occurs just before complete closure which brings the clutch member 58 down through the opening 38 in the record into the bore in the driving hub. The operation of the driving motor, the stepping motor which adjusts the pick-up head, and the solenoid 140 are, of course, responsive to automatic signals from the computer. In closed position of the door, pin 100 engages with latching projection 174 as shown in FIG. 7 so that when the door is opened, that is, lifted, the ejector immediately ejects the record.

In order to open the door, that is, to allow the frame 56 to lift, the operator merely pushes in on the finger piece 90 which moves the trigger member 86 in counterclockwise direction so that the latching hook or finger 92 disengages from the latching member 82 thus releasing the door, that is, the frame 56 allowing it to rise. As soon as this happens, the ejector member 166 acts on the record to eject it out through the front opening, that is, the recess 14, of the panel 12. This is illustrated in FIG. 8 wherein the pin 100 no longer engages the latching projection 174 and the record is moved out.

From the foregoing, those skilled in the art will readily understand the nature of the invention and the manner of its operation and utilization, and the manner in which it achieves and realizes all of the objectives as set forth in the foregoing. The foregoing disclosure is representative of a preferred form of the invention and is to be interpreted in an illustrative rather than a limiting sense, the invention to be accorded the full scope of the claims appended thereto.

What is claimed is:

1. In an apparatus having record means and record drive means, the apparatus including a door which is openable for insertion of the record means, ejector means engaged by the record means upon insertion thereof, latch means for latching the ejector means when the record has been inserted to a predetermined position, the ejector means acting to eject the record means unless the ejector means has become latched and means whereby the ejector means is unlatched by closing the door.

2. Apparatus as in claim 1 wherein the record drive means has a circular driving member and the record means has a central opening configured to register with and to engage with the circular driving member, whereby upon closing movement of the door the ejector means acts on the record means to cause it to be accurately aligned and positioned for drive of the record means by the drive means.

3. A apparatus as in claim 2 wherein the said door includes a part overlying the record means, the said door carrying a clutch member to engage with the opening in the record means with the driving member.

4. Apparatus as in claim 1 wherein the said apparatus has guide means for guiding movement of the record means with respect to the door and with respect to the ejector means.

5. Apparatus as in claim 1 wherein the ejector means includes an ejector member, a spring acting on the ejector member, the latch means including a spring latch engageable with the ejector member, the said unlatching means including a member carried by the door and engageable with the spring latch for unlatching.

6. Apparatus as in claim 5 wherein the said door is in the form of a frame member positioned for swinging movement over the record means, means biasing the door in the opening direction, means for latching the door in its closed position, the door latching means being manually unlatched for opening the door and allowing ejection of the record means.

7. Apparatus as in claim 1 wherein the said door is in the form of a frame member positioned for swinging movement over the record means, means biasing the door in the opening direction, means for latching the door in its closed position, the door latching means being manually unlatched for opening the door and allowing ejection of the record means.

* * * * *